US009226130B2

(12) United States Patent
Nylander et al.

(10) Patent No.: US 9,226,130 B2
(45) Date of Patent: Dec. 29, 2015

(54) METHODS AND ARRANGEMENTS RELATING TO MOBILITY CONTROL INFORMATION

(75) Inventors: Tomas Nylander, Värmdö (SE); Jari Vikberg, Järna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 228 days.

(21) Appl. No.: 13/702,279

(22) PCT Filed: Jul. 13, 2010

(86) PCT No.: PCT/SE2010/050838
§ 371 (c)(1),
(2), (4) Date: Dec. 5, 2012

(87) PCT Pub. No.: WO2012/008887
PCT Pub. Date: Jan. 19, 2012

(65) Prior Publication Data
US 2013/0165120 A1    Jun. 27, 2013

(51) Int. Cl.
*H04W 36/00* (2009.01)
*H04W 8/08* (2009.01)

(52) U.S. Cl.
CPC ............ *H04W 8/08* (2013.01); *H04W 36/0055* (2013.01); *H04W 36/0061* (2013.01)

(58) Field of Classification Search
CPC .............. H04W 8/08; H04W 36/0055; H04W 36/0061
USPC .......................................... 455/436; 370/331
See application file for complete search history.

(56) References Cited

U.S. PATENT DOCUMENTS

2009/0323638 A1    12/2009    Catovic et al.
2010/0173626 A1    7/2010    Catovic et al.

OTHER PUBLICATIONS

International Search Report, Application No. PCT/SE2010/050838, Mar. 24, 2011.
Nokia Siemens Networks et al.: "UE History Information for Inter-RAT", 3GPP Draft; R3-083202, 3$^{rd}$ Generation Partnership Project (3GPP) Mobile Competence Centre; 650, Route des Lucioles; F-06921 Sophia-Antipolis Cedex; France, Prague, Czech Republic, Nov. 6, 2008, XP050324426, 10 pp.

*Primary Examiner* — Charles Shedrick
(74) *Attorney, Agent, or Firm* — Myers Bigel Sibley & Sajovec, P.A.

(57) ABSTRACT

Mobility history relating to a plurality of cells visited by the user equipment (130) is obtained (210) from the first radio network node (120), Next, mobility control information (120) is generated (220) based on the mobility history. Further, the mobility control information is provided (240, 245) to the radio communication system (100), Moreover, a first radio network node (120) for enabling a network node (110, 150, 160, 170, 180) to generate mobility control information to be used by the radio network node (120) for managing signalling and processing due to mobility events in a radio communication system (100) is provided. The first radio network node (120) collects (260) mobility history relating to a user equipment connected to the first radio network node (120). The first radio network node (120) sends (210) the mobility history to the network node (110), and receives (240) from the network node (110) mobility control information associated with the first radio network node (120).

30 Claims, 8 Drawing Sheets

METHODS AND ARRANGEMENTS RELATING TO MOBILITY CONTROL INFORMATION

CROSS REFERENCE TO RELATED APPLICATION

This application is a 35 U.S.C. §371 national stage application of PCT International Application No. PCT/SE2010/050838, filed on 13 Jul. 2010, the disclosure and content of which is incorporated by reference herein in its entirety. The above-referenced PCT International Application was published in the English language as International Publication No. WO 2012/008887 A1 on 19 Jan. 2012.

TECHNICAL FIELD

The present invention relates to a method and an arrangement for managing mobility control information in a radio communication system. Moreover, the present invention relates to a method and an arrangement in a first radio network node for enabling a network node to generate mobility control information to be used by the first radio network node.

BACKGROUND

A known radio communication system comprises a first radio access network, based on a first radio access technology (RAT) (or a first radio access network (RAN) layer), wherein the first radio access network provides limited coverage. Furthermore, the radio communication system comprises a second radio access network, based on a second radio access technology (or a second RAN layer). The second radio access network provides a more general coverage than the first radio access network. In such a radio communication system signalling and processing due to mobility events, such as active mode handover (HO) and idle mode movements of a user equipment, may cause the radio communication system to be overloaded or at least loaded to an unnecessarily high extent.

Depending on deployment scenarios, initial LTE (Long Term Evolution) rollouts may be one such case.

Another case may be when only a first radio access network is comprised in the radio communication system. Then, indoor verses outdoor coverage may differ from each other, because different carriers (or frequency bands) may be used for indoor versus outdoor coverage.

In another scenario, a WLAN (Wireless Local Area Network) network may be used to provide access to mobile network services in a mobile communication system, comprising a mobile radio access network and a mobile core network. Each time a user equipment moves between WLAN coverage and mobile network coverage, the mobile core network needs to be informed. Hence, signalling and processing due to mobility events, which occurs for example when the user equipment moves between WLAN and mobile network coverage, needs to be handled by the mobile core network.

In a further scenario, employing femto base station, similar load issues are likely to occur.

A problem in the above mentioned scenarios is, hence, that the signalling and processing due to mobility events puts an unnecessarily large load on the radio communication system.

SUMMARY

An object of the present invention is to reduce signalling and processing in a radio communication system due to mobility events, such as active mode handover and idle mode movements of the user equipment.

According to an aspect of the invention, the object is achieved by a method for managing mobility control information in a radio communication system, comprising a first radio network node and a user equipment. Mobility history relating to a plurality of cells visited by the user equipment is obtained from the first radio network node. Next, mobility control information is generated based on the mobility history. Further, the mobility control information is provided to the radio communication system. In this manner, the radio communication system is enabled to use the mobility control information in a mobility control procedure relating to the user equipment when the user equipment moves among said plurality of cells.

According to another aspect of the invention, the object is achieved by an arrangement for managing mobility control information in a radio communication system, comprising a first radio network node and a user equipment. The arrangement may comprise an obtaining unit configured to obtain from the first radio network node mobility history relating to a plurality of cells visited by the user equipment, a generating unit configured to generate mobility control information based on the mobility history, and a providing unit configured to provide the mobility control information to the radio communication system.

An idea of the present invention is to obtain the mobility history and generate mobility control information based thereupon. The generated mobility control information is then provided to the radio communication system, which may reduce signalling and processing due to mobility events by use of the mobility control information. As a result, the above mentioned object is achieved. UE History as is known from prior art may be an example of the mobility history. Notably, the UE History in prior art is lost, when a user equipment releases its context, whereas in the present invention the mobility history is obtained and used as described above.

In this manner, selection of a cell, e.g. active mode handover to a cell and idle mode movements to a cell, with limited coverage may be avoided. Thus, the number of mobility events is reduced.

According to another aspect of the invention, the object is achieved by a method in a first radio network node for enabling a network node to generate mobility control information to be used by the radio network node for managing signalling and processing due to mobility events in a radio communication system. The radio communication system comprises the network node and the first radio network node. The first radio network node collects mobility history relating to a user equipment connected to the first radio network node. The first radio network node sends the mobility history to the network node. The first radio network node receives from the network node mobility control information associated with the first radio network node.

According to another aspect of the invention, the object is achieved by an arrangement in a first radio network node for enabling a network node to generate mobility control information to be used by the first radio network node for managing signalling and processing due to mobility events in a radio communication system. The radio communication system comprises the network node and the first radio network node. The arrangement may comprise a collecting unit configured to collect mobility history relating to a user equipment connected to the first radio network node, a sending unit configured to send the mobility history to the network node, and a receiving unit configured to receive from the network node mobility control information associated with the first radio network node.

By allowing the mobility history to be sent to another network node from the first radio network node, knowledge about movements of the user equipment may be obtained. When the other network node has determined the mobility control information, the first radio network node receives the mobility control information. Next, the first radio network node may apply the mobility control information in procedures related to mobility events.

In this manner, the method for managing mobility control information may be performed by a separate network node comprised in the radio communication system.

Further features of, and advantages with, the present invention will become apparent when studying the appended claims and the following description. Those skilled in the art realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
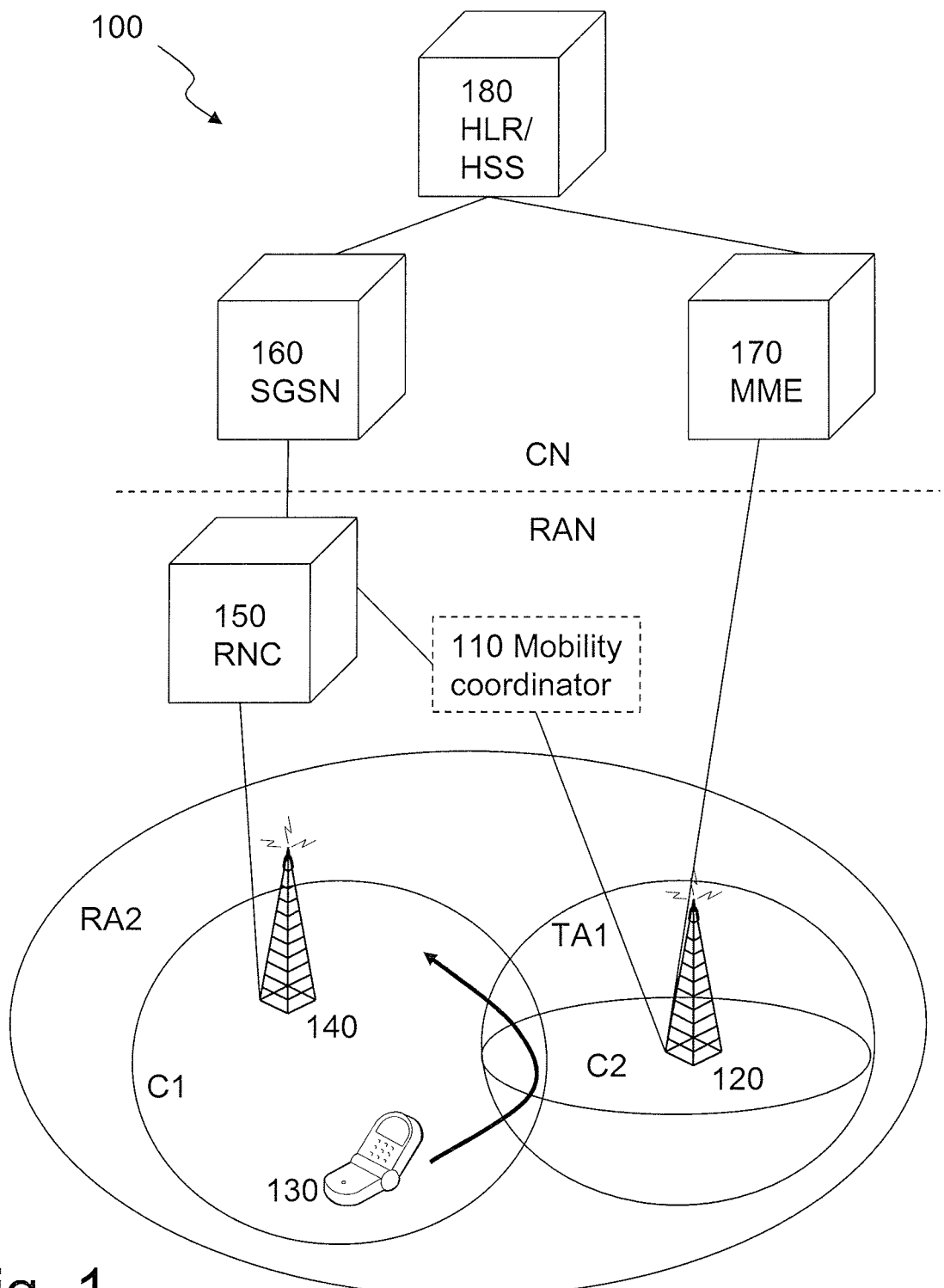
FIG. 1 shows a schematic overview of an exemplifying radio communication system in which the present solution may be implemented.

Throughout the following description similar reference numerals have been used to denote similar elements, parts, items or features, when applicable.

With reference to FIG. 1, there is shown an exemplifying radio communication system 100, comprising two radio access networks (RANs) and a core network (CN) having parts which may be dedicated to each of the two radio access networks. The core network comprises an HLR (Home Location Register) and/or a HSS (Home Subscriber System) 180, a serving GPRS support node (SGSN) 160 for a WCDMA RAN, an MME (Mobility Management Entity) 170 for a LTE RAN. The WCDMA RAN comprises a radio network controller (RNC) 150 and a radio base station 140. The LTE RAN comprises a first radio network node 120, such as an eNB. The HLR/HSS node in the core network is shown as common node between WCDMA and LTE/SAE. A coverage for the WCDMA RAN comprises a cell C1 (only one cell is shown) being part of a routing area 2, RA2, and in a similar way a coverage for LTE RAN comprises a cell C2 (only one cell is shown) being part of a tracking area 1, TA1. A single user equipment 130, referred to as a UE, is also shown. The UE 130 is currently in the WCDMA coverage, i.e. the USER EQUIPMENT 130 camps on a cell controlled by the radio base station 140. In other examples, the radio base stations may be comprised in the same radio access network.

In FIG. 1, there is also shown a mobility coordinator 110, referred to as MC. The mobility coordinator may be implemented as a separate node or as an integral function of another node, such as the eNB, the Radio Network Controller, an O & M node, an MME SGSN, a combined MME/SGSN or the like. In other examples, the mobility coordinator may be a module, such as a software module (for example an OSS application), a hardware module or combination thereof, within any of the aforementioned nodes/entities. In some embodiments, a combined radio network node that comprises the MC and GSM BSC (GSM Base Station Controller) and/or WCDMA RNC functionality may be realized. When it is stated herein that the MC functionality may be comprised in a radio base station 140, it is to be understood that such radio base station also may perform the functions of an RNC, such as the radio network controller 150.

When a user equipment 130 moves around among the cells of the radio communication system 100 in FIG. 1, the user equipment 130 may be in active mode or in idle mode.

A user equipment in active mode performs handover when moving among cells in the radio communication system 100. In some RATs, such as in a LTE network, a user equipment history (referred to as UE History) is maintained. The UE History provides a mechanism for collection of information about the UE movements in active mode. When UE History is maintained in LTE/SAE, WCDMA and/or GERAN/GSM, it is possible to collect information about inter radio access technology (IRAT) handovers between these RATs. In order to register a IRAT handover, it enough that two RATs are maintaining the UE History. Therefore the functionality for handling IRAT is implemented in eNodeBs, in RNCs and/or in BSC, respectively. The RNC/eNodeB/BSC collects and stores the UE History as long as the user equipment 130 stays in one of its cells. If there is a need for performing a handover, the stored UE History is forwarded to the target side, e.g. the RNC or eNB that the user equipment 130 is handed over to, during the Handover preparation signalling over S1, Iu and A-interfaces in the different transparent RAN containers depending on the Target RAT selected or as part of X2AP signalling when Intra-LTE X2-based handover is triggered. The information in the UE History comprises for each cell visited by the user equipment:

Global cell Identifier, i.e. the E-CGI for E-UTRAN cells and PLMN-ID & Cell-ID for UTRAN cells, Cell type and this is currently defined as: {macro, micro, pico or femto} in RANAP and {very small, small, medium, large} in S1AP, and The duration of the visit in the cell i.e. how long the user equipment stayed in the cell.

A user equipment in idle mode performs Location Registrations towards the network while moving between the different cells and registration areas. This is referred to as idle mode movements herein. The registration areas used in GSM and WCDMA are Location Area (LA) for CS domain and Routing Area (RA) for PS domain. In LTE/SAE the registration area is called Tracking Area (TA). The corresponding Location Registration procedures are Location Update (LU), Routing Area Update (RAU) for GSM and WCDMA and Tracking Area Update (TAU) for LTE/SAE. The main purposes of Location Registrations are to inform the core network (CN) about the UE location on the registration area level allowing the Core Network to page the user equipment 130 and to allow the CN to fetch subscription data for the UE from HLR/HSS and perform Access Control for the user equipment 130, e.g. in the PLMN level or an a registration area level and to inform the user equipment 130 about the result of this Access Control.

With the introduction of a new RAT, a high number of LU/RAU/TAU procedures will occur since it is likely that initially there is limited coverage of the new RAT. Now referring to FIG. 1, an old RAT may be WCDMA and the new RAT may be LTE/SAE. It is usually preferred to make the new RAT, the first-choice RAT for all user equipments that are capable of accessing it. When such a user equipment is moving in idle mode and detects a cell belonging to the new RAT (i.e. LTE/SAE in this case), it attempts to start camping on it and as part of this camping procedure the user equipment 130 performs the Location Registration (i.e. TAU in this case) towards the core network. In a similar way, RAU is triggered each time when the user equipment leaves the LTE/SAE and selects WCDMA. This increased signalling load is also a concern for operators and has been addressed with different mechanisms.

With limited coverage of the new RAT, user equipments may toggle between the old and the new RATs. This will increase the load on the core network nodes, including MSCs, SGSNs, MMEs and HLR/HSS nodes, as exemplified by the example radio communication system 100 in FIG. 1. Whenever the UE toggles between WCDMA and LTE/SAE, a Location Registration is triggered. This leads to signalling from the UE all the way to the HLR/HSS. When LTE/SAE is selected, TAU is triggered and when WCDMA is selected, RAU is triggered.

The problem of signalling load increase due to movements of a user equipment in active mode is in some aspects similar to what is described for a user equipment in idle mode above. It may be preferred that the radio communication system triggers active mode mobility, i.e. signalling (for example handover) due to movements of a user equipment in active mode as fast as possible to ensure that the UE's active mode connection can be maintained.

Also, in active mode in the PS domain, the Location Registration is performed and in addition to this, the active connection needs to be moved between the different RATs and redirected to the RAT to which the user equipment has moved. The impact on this depends on the procedure used to move the user equipment between the RATs. For example, if PS Handover would be used to move the user equipment from WCDMA to LTE, then the following steps would be taken:

1. PS Handover preparation phase when the source RAT requests reservation of resources from the target RAT. The moving of the user plane is also prepared in this phase.
2. PS Handover execution phase when the user equipment moves to the target RAT.
3. In addition, the active mode moving is followed by a Location Registration procedure (i.e. RAU or TAU).

In LTE, there is maintained a so called neighbour list and neighbour associations, which are automatically built using an Automatic Neighbour Relation (ANR) function. The ANR functionality is a part of a Self Organizing Network (SON) concept, which is implemented in LTE. However, this concept may have the following drawback. When the ANR function is used, an eNB builds the neighbour lists/associations based on information received from user equipments. It may, hence, happen in some cases that a non-preferred cell may be included in the neighbour lists/associations and, consequently, may also be used as a target cell in a handover procedure. The cell is non-preferred in the sense that the cell has, for example, a very limited coverage (such as a small cell size) and/or the user equipment stayed in the cell for a short time (in absolute time or relative to duration in other cells visited by the user equipment). A non-preferred cell may, for example, be indicative of a cell to which handover is to be avoided or in which registration is to be avoided for any one of more of the reasons above, such as short stay, limited coverage and more. As a result of including the non-preferred cell in the neighbour list, the signalling and processing load due to active mode user equipments may increase further.

Furthermore, it is a challenge to get continuous coverage along a path, such as a train line, a bus route, a road etc, when a new RAT is introduced. If there are gaps in the coverage along the path, then a lot of signalling may occur when a user equipment selects another RAT or performs a handover to another RAT. This may also result in service degradation for the end user depending on the capabilities of the RAT selected and service used. Traditionally, costly drive tests are performed to ensure quality of services. Therefore, it would be beneficial if drive tests could be avoided, or at least reduced, when modifications are performed in the network. It is currently assumed that one will need to obtain new information from the user equipments in order to reduce the need for drive tests. Therefore, an introduction of such user equipment-based functionality is likely far away in time and another solution is needed in the short and medium term. A solution to this problem is also presented herein.

Now returning FIG. 1 and the solution presented herein. The main component of the present solution is the Mobility Control function or the mobility coordinator (MC). The main steps of the solution are:

In a first step, a configuration of the communication between the RAN nodes (eNB, BSC, RNC) and the Mobility coordinator is performed. For example, the RAN node may initiate the communication towards the MC. The address of the MC is retrieved based on configuration or DNS. For example, a DNS query may be built based on the area the RAN node is covering, typically Routing Area (RA) in BSC and RNC cases, and Tracking Area (TA) in the eNB cases. The RAN Node informs the MC about all the served cells, RAT types and known neighbour cells.

In a second step, the RAN nodes, such as the RNC 150, the radio base station 140 or the eNB 120, gather information, e.g. mobility history, about UE movements and the information is forwarded to the MC for evaluation. Typical information gathered is the cells/RATs visited in active mode and the duration of each visit for each user equipment separately. The information is collected and co-ordinated between the RAN nodes so that each RAN Node forwards the mobility history to the next RAN Node handling the UE connection. The last RAN Node in which the UE connection is released forwards the information to the MC. Next, the MC retrieves (or obtains) information about user equipment movements from the RAN nodes (i.e. BSC, RNC, eNB), In a third step, called "Mobility Coordination evaluation algorithm", the MC evaluates the information, herein referred to as mobility history, received (or obtained) from the RAN nodes and detects cells with "spotty coverage", "bad neighbouring cells" and coverage holes. One example of a cell with "spotty coverage" is a cell that has been visited by the UE for a short time. The MC also uses the information for multiple different UE connections and RAN nodes to decide which cells and RATs may be marked as non-preferred cells by default. An example of a cell that may be considered as belonging to a group of "bad neighbouring cells" is a cell that is visited for a short time or a cell which the user equipment toggles to and from intermittently. E.g. the user equipment camps on the bad neighbouring cell for a while, then camps on another cell for a while to again switch back to camp on the bad neighbouring cell. Such bad neighbouring cell is, hence, a non-preferred cell.

In a fourth step, called "Execution or Mobility Coordination", once knowledge about which cells have been visited and optionally duration of each visit, herein referred to as mobility control information, is built up in the MC, the mobility control information may be used in different manners as described in the following. Firstly, the mobility control information may be provided (or sent) to the RAN nodes. In this manner, the RAN nodes may be informed about coverage and the information is used for camping and handover strategies to be applied for the user equipments. In order to obtain information about coverage for a first radio access network, there needs to be a second radio access network that provides coverage where the first radio access network fails to provide coverage. The mechanisms used are, for example, common priorities, dedicated priorities and handover target cell selection as described in more detail below. Secondly, the RAN nodes may be informed about 'bad neighbours'. Furthermore, the MC may produce information about coverage holes. Optionally, the MC informs the RAN nodes about the results of the evaluations. In the case that the MC function is integrated in a radio network node, such as a radio base station, eNB or the like this information is internally distributed from one module to another module within the radio base station.

Figure 2:
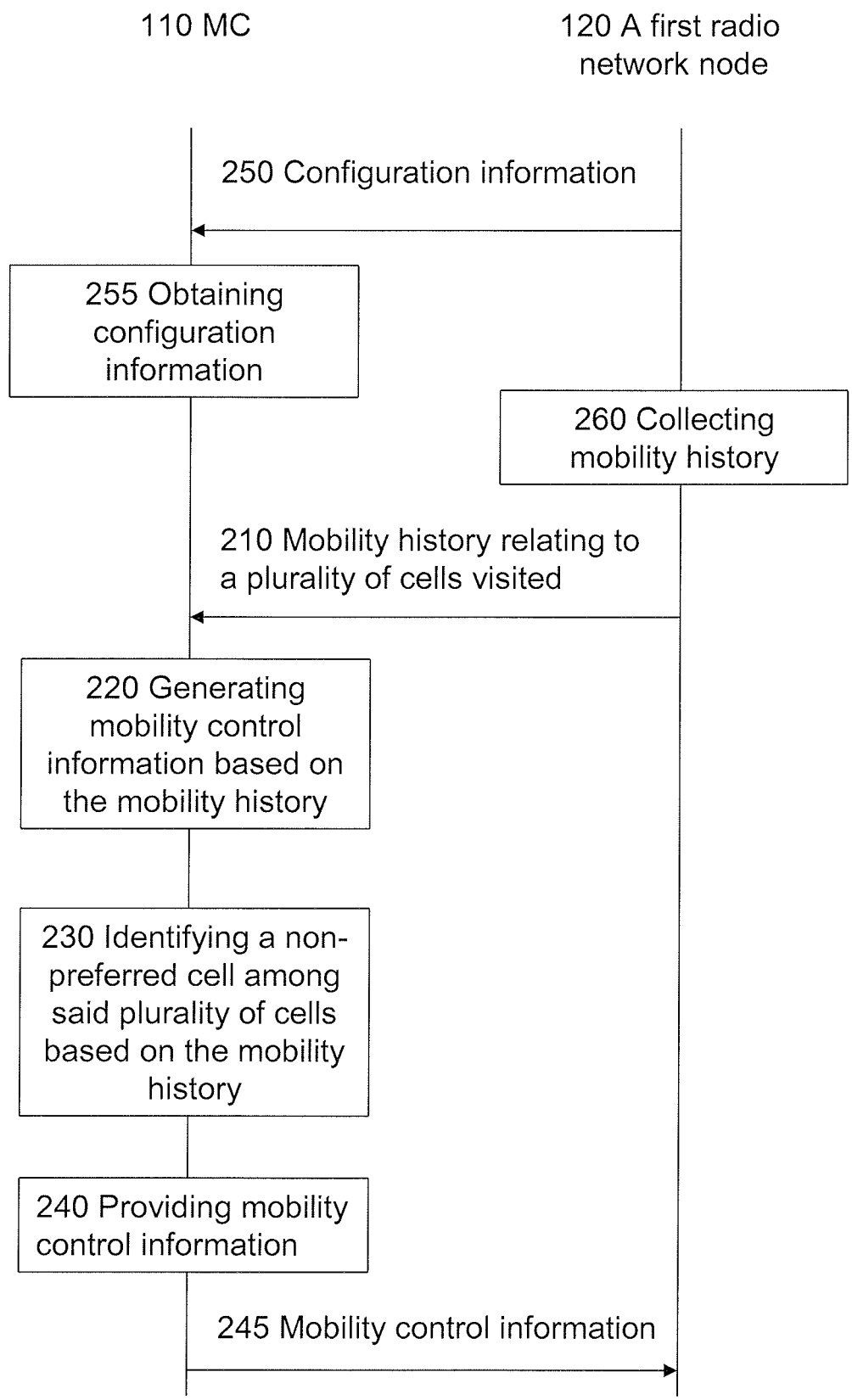
FIG. 2 shows a schematic, combined signalling and flow chart of an embodiment of a method in the radio communication system according to FIG. 1 for managing mobility control information in the radio communication system.

In FIG. 2, there is shown a schematic combined signalling and flow chart of a method according to embodiments of the present invention, when performed in the radio communication system 100 according FIG. 1. The following steps may be performed. The order of the steps may, in some embodiments, differ from what is described below and from what is illustrated in the Figure.

In an optional step 255, the MC obtains configuration information from the first radio network node 120. In some embodiments, the configuration information is received 255 from the first radio network node 120.

In a step 260, the first radio network node 120 collects mobility history relating to a user equipment 120 connected to the first radio network node 120.

In a step 210, mobility history relating to a plurality of cells visited by the user equipment 130 is obtained from the first radio network node 120.

In a step 220, mobility control information is generated based on the mobility history.

In an optional step 230, a non-preferred cell among said plurality of cells is identified based on the mobility history.

In a step 240, the mobility control information is provided to the radio communication system 100. In this manner, the radio communication system 100 is enabled to use the mobility control information in a mobility control procedure relating to the user equipment when the user equipment moves among said plurality of cells. For example, the mobility control procedure may be a procedure occurring in conjunction with a mobility event, such as a handover procedure. In some embodiments, the mobility control information is sent 245 to the first radio network node 120.

In some embodiments, said plurality of cells is comprised in the radio communication system 100. In some embodiments, some or all of said plurality of cells may be associated with the first radio network node 120. In some embodiments, some or all of said plurality of cells may be associated with a/the second radio network node 140. Optionally, the first and second radio network node may be comprised in a first and second radio access network, respectively.

In some embodiments, the mobility control information is generated for the first radio network node 120. For example, a corresponding mobility control information that corresponds to the first radio network node 120 is generated. In more detail, the mobility control information is associated to the first radio network node 120.

Since knowledge about radio coverage for different Radio Access Technologies (RATs) and RAN layers (e.g. macro and micro) is dynamically created based upon UE movements in the form of mobility history, it is possible to control which RAT or RAN layer a UE may use. In this manner, signalling from the user equipment towards the network may be reduced. In some embodiments of the present invention, it is intended to dynamically identify cells with "spotty coverage" and to avoid unnecessary selection of these cells in both idle and active mode. In some embodiments, such a cell is referred to as a non-preferred cell.

The solution presented herein may assist a radio communication system in maintaining its neighbour relations. Furthermore, the functionality may assist an operator to check the coverage of a certain radio access network using a certain radio access technology.

An advantage with the present solution is that it may be applied to different RANs. Thus, in the area of O & M, security and transport, synergies may be gained. For example, the same core network components/applications may be used for different radio access networks. The gained synergies may provide benefits for both network providers and operators.

A RAN Node provides the mobility history to the MC before user equipment context is deleted in the RAN node, i.e. either at release of the UE connection or when the UE performs handover out from the RAN Node. In some embodiments, the mobility history may be the same as the UE History described above.

Figure 3:
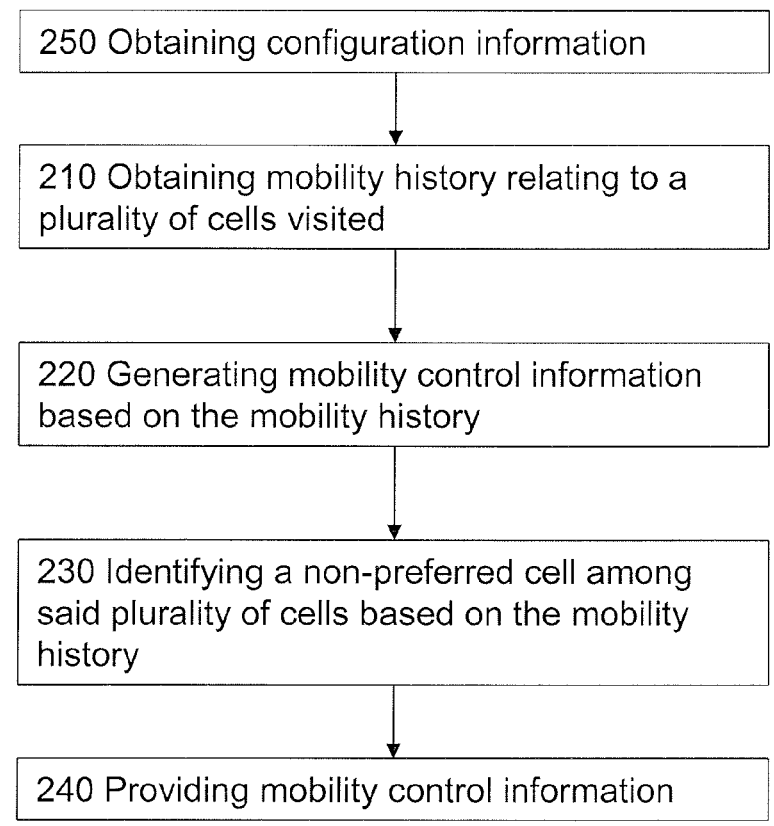
FIG. 3 shows a schematic flow chart of an embodiment of the method for managing mobility control information in the radio communication system.

In FIG. 3, there is shown a schematic, exemplifying flow chart of the method for managing mobility control information in a radio communication system 100, comprising a first radio network node 120 and a user equipment 130. The user equipment 130 may be served by the first radio network node 120, when the mobility information is created. The following steps may be performed. The order of the steps may, in some embodiments, differ from what is described below and from what is illustrated in the Figure.

In a step 250, the MC obtains configuration information from the first radio network node 120. In some embodiments, the configuration information is received 250 from the first radio network node 120.

In a step 210, mobility history relating to a plurality of cells visited by the user equipment 130 is obtained from the first radio network node 120.

In a step 220, mobility control information is generated based on the mobility history.

In a step 240, the mobility control information is provided to the radio communication system 100. In this manner, the radio communication system 100 is enabled to use the mobility control information in a mobility control procedure relating to the user equipment when the user equipment moves among said plurality of cells. For example, the mobility control procedure may be a procedure occurring in conjunction with a mobility event, such as a handover procedure.

In some embodiments of the method for managing mobility control information, the mobility history comprises one or more of:
- global cell identities for each cell visited by the user equipment, e.g. E-CGI for E-UTRAN cells, CGI for GERAN cells, and LAI & CI for UTRAN cells,
- cell types of cells, identified by the global cell identities, such as {macro, micro, pico or femto} in RANAP and {very small, small, medium, large} in S1AP, and
- duration time for indicating time spent by the user equipment in cells, identified by the global cell identities.

Optionally, the mobility history may comprise a frequency band indicator for identifying the frequency band(s) used in the cell(s), identified by the global cell identities. Expressed differently, information about used frequency in the cell visited may be comprised in the mobility history. For example, the information about used frequency may indicate the frequency band used in the visited cell. In this manner, inter frequency handovers may be detected. Furthermore (or as an alternative), the information about used frequency of cells may be provided to the MC functionality during configuration.

In some embodiments, the mobility history comprises a series of at least three posts, such as data posts. Each post comprises at least a global cell identity, a cell type of the cell identified by the global cell identity and a duration time for indicating time spent by the user equipment in the cell identified by the global cell identity. Optionally, the mobility history may be built up by a 3×n matrix, where n is the number of visited cells.

In some embodiments of the method for managing mobility control information, the configuration information may comprise one or more of:
- Node identity (e.g. RNC-ID, eNB-ID and/or some form of BSC node identity)
- Node type (i.e. RAT type, e.g. GERAN, WCDMA/or LTE)
- Global Cell identities on node (e.g. CGI, E-CGI or LAI+CI)
- Cell types of cells (e.g. very small, small, medium, large)
- Neighbour cells (e.g. a number of CGI, E-CGI and/or LAI+CI)
- Neighbour cell creation method (e.g. ANR, manual), and
- Information about used frequency of the cell visited.

In some embodiments of the method for managing mobility control information, the step of generating 220 mobility control information further comprises a step of identifying 230 a non-preferred cell C2 among said plurality of cells based on the mobility history.

In some embodiments of the method for managing mobility control information, the mobility history indicates that the duration time for the non-preferred cell C2 is shorter than a threshold value.

In some embodiments of the method for managing mobility control information, the threshold value is preconfigured or dynamically determined based on the mobility history. For example, a dynamically determined threshold value may be set to a certain percentage of an average duration time, which may be determined based on the mobility history. E.g. the average duration time may be 4 min and the certain percentage may be 10%, which yields a dynamically determined threshold value of 0.4 min, i.e. 24 s.

In some embodiments of the method for managing mobility control information, the mobility history indicates, by means of the global cell identities, that a first cell is visited before and after the non-preferred cell C2. This embodiment is similar to what is shown in FIG. 1. A difference is, though, that the radio network node 120 and the radio network node 140 are associated to the same radio access network.

In some embodiments of the method for managing mobility control information, the radio communication system 100 further comprises a second radio network node 140 and a first radio access network, comprising the first radio network node 120. Furthermore, the step of generating 220 mobility control information is performed by generating corresponding mobility control information for at least one of the first and second radio network nodes 120, 140, based on the mobility history, and the step of providing 240, 245 the mobility control information is performed by providing the corresponding mobility control information.

In some embodiments of the method for managing mobility control information, the radio communication system 100 further comprises a second radio access network, wherein the second radio access network comprises the second radio network node 140.

Figure 4:
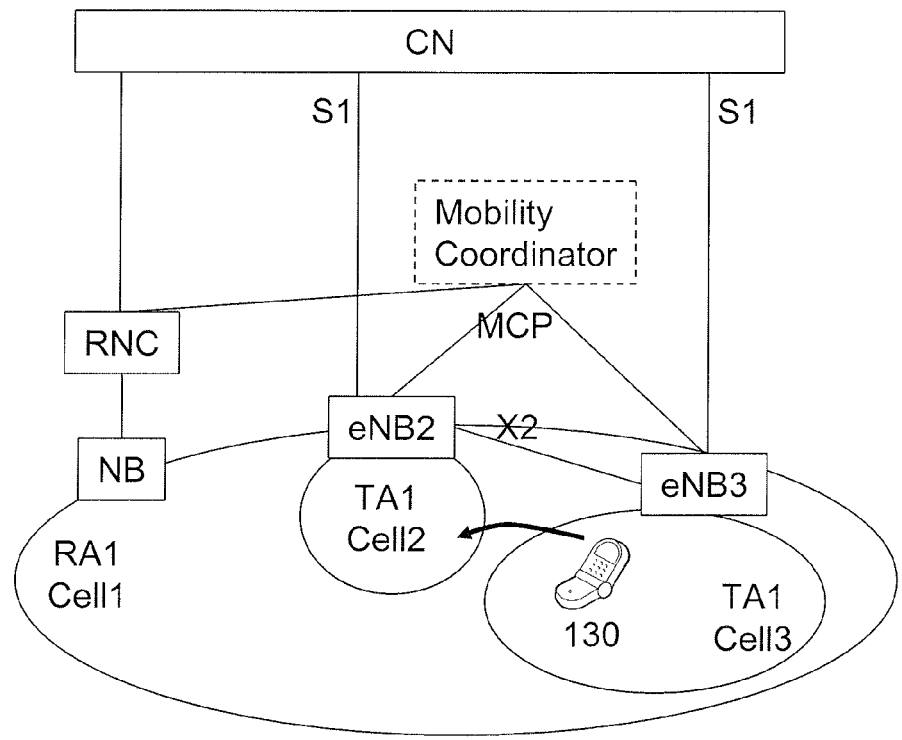
FIG. 4 shows another scenario, to which another embodiment of the present invention may be applied.

With reference to FIG. 4, in some embodiments of the method for managing mobility control information, the mobility history indicates, by means of the global cell identities, that a first and a second cell Cell2, Cell3, visited before and after the non-preferred cell Cell2, respectively, are associated with the first radio access network, such as LTE for eNB2 and eNB3, and the non-preferred cell Cell1 is served by the second radio network node NB, comprised in the second radio access network, such as WCDMA. In this embodiment, the non-preferred cell Cell2 may most likely be the only cell that the UE may camp on. Hence, the user equipment 130 will have to use the non-preferred cell rather than not be able to transmit at all. In this manner, it is possible to detect and register coverage holes of the first radio access network. As a result, a network provider may obtain information about where to install further radio network nodes, such as eNBs, radio base stations and the like.

In some embodiments of the method for managing mobility control information, as shown in for example FIG. 1, the first cell C1 is associated with the first radio access network and the non-preferred cell C2 is served by the second radio network node, comprised in the second radio access network.

In some embodiments of the method for managing mobility control information, the method is performed in (or by) the first radio network node 120.

In some embodiments of the method for managing mobility control information, as described in conjunction with for example FIG. 12 below, the method further comprises a step of generating common priorities information based on the mobility control information, and sending to the user equipment the common priorities information.

In some embodiments of the method for managing mobility control information, as described in conjunction with for example FIG. 13 below, the method further comprises generating dedicated priorities information based on the mobility control information, and sending to the user equipment the dedicated priorities information.

In some embodiments of the method for managing mobility control information, a step of applying the mobility control information as dynamic input to Hand Over algorithms in first radio network node 120 may be performed. In an example, when 3G is to have priority over LTE, for active mode mobility, the RNC may increase the time to trigger the handover to the IRAT cell in the handover decision procedure. In another example, when GERAN is to have priority over 3G/LTE, for active mode mobility, the BSC may increase the time to trigger the handover to the IRAT cell in the handover decision procedure.

In some embodiments of the method for managing mobility control information, the first radio network node 120 is associated with a neighbour list, indicating cells that are neighbours to a cell in which the user equipment is located. The method may further comprise the step of deleting the non-preferred cell from the neighbour list. In this manner, it is possible to detect bad neighbours and by that better handover performance may be provided since only 'good' neighbours are considered for measurements, which are performed to find target cell candidates. Signalling is, hence, reduced because there are a smaller number of neighbours that needs to be measured by the UE. In addition, this feature, referred to herein as a neighbour list pruning, may reduce the number of neighbouring cells, since there are limitations on the possible number of different types of neighbouring cells. One use of this feature is for LTE and eNBs, since it is here the Automatic Neighbour Relation (ANR) feature exists and the probability that "bad neighbours" exists is higher than in the other RATs where neighbour relations are created with planning and manual configuration. However, the feature is useful even for the case when manual handling of neighbour relations are done, since the feature may also detect human errors. For the neighbour list pruning to work for intra LTE neighbours, it is sufficient if the mobility history is maintained and sent between eNBs i.e. it is not necessary to implement the mobility history feature or the communication towards the MC in the other RAN nodes. In case, the feature may be able to prune also neighbours in other RATs, the respective RAT needs to maintain the mobility history and handle it at IRAT handovers to and from LTE.

Consider the case when an eNB receives information from the MC that it has triggered UE handover to an E-UTRAN cell with a short stay before next handover to another E-UTRAN cell and the last E-UTRAN cell also is available as a neighbour in the original eNB. In this case, the original eNB may upgrade the last cell in the handover candidate ranking to reduce the number of handovers, or in certain cases, remove the intermediate cell as a handover candidate.

Figure 5:
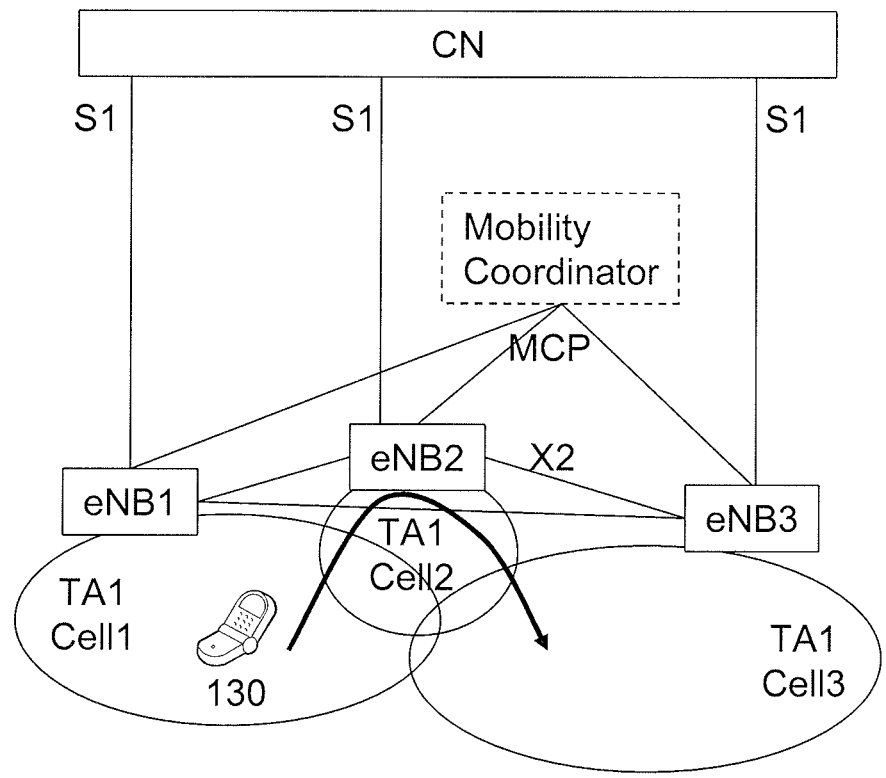
FIG. 5 shows a scenario, to which an embodiment of the present invention may be applied.

With reference to FIG. 5, the ANR feature has created the neighbour relations in eNB1 so that Cell2 and Cell3 are neighbours to Cell1. A UE using eNB1 is active in Cell1, and UE moves towards Cell2 and Cell3. The eNB1 receives measurements indicating that Cell2 is better than Cell3. The eNB1 then initiates a handover to eNB2 that controls Cell2. The UE, however, stays a short time in Cell2 before being handed over to Cell3. The session then ends in Cell3, and the eNB3 reports the mobility history to the MC. The MC then sees that duration in Cell2 was very short and informs the node that controlled the preceding cell, i.e. eNB1 and Cell1. The eNB1 may then see that it has the two succeeding cells as neighbours and could have initiated the handover directly to Cell3 and the eNB3. The eNB1 may then modify its weighting for these neighbours and take that into account for coming handover decisions. To handle possible errors, e.g. that the skipping of Cell2 in the example above causes a dropped session, some additional measures may be applied. The source side, i.e. eNB1, may always find out if handover to the target was unsuccessful. If this happens the eNB1 could revoke the temporary measures taken, i.e. not handover directly to Cell3.

In some embodiments of the method for managing mobility control information, a further step of detecting a coverage hole based on the mobility history is performed. The detected coverage hole (or rather information about the detected coverage hole) may be used as input to a network configuration procedure, in which the network is set up and/or configured, e.g. neighbour lists are created. In LTE, it is likely that there will be coverage holes, which might be the case since it is a new RAT being deployed. This may cause problems and substantial signalling load towards the core network, if for example a path, such as bus route or train line, does not have contiguous coverage. The coverage may be non-contiguous because it traverses a coverage hole.

For example, as shown in FIG. 4, a session is started in Cell3 and eNB3. The UE 130 performs IRAT handover to Cell1 and remains there for a short while, then an additional IRAT handover to Cell2 and eNB1 is performed. When session is released, the mobility history is reported to the Mobility Coordination (MC) function. The MC may identify the visit in Cell1 with a short stay and may produce information to visualize this, e.g. in reports.

Coverage hole detection may be handled with a limited version of the Mobility Coordination Protocol (MCP, see FIG. 11) and a simplified handling in the participating nodes, i.e. the MC do not need to report back suggestions on actions to apply, neither do the participating nodes need to implement any actions. For this to work, the eNBs for LTE needs to be connected to the MC. The other RATs need only maintain the mobility history function and forward it at handovers.

In some embodiments of the method for managing mobility control information, the method is performed by a network node 110, 150, 160, 170, 180 comprised in the radio communication system 100, wherein the network node 110 is different from the first radio network node 120.

Figure 6:
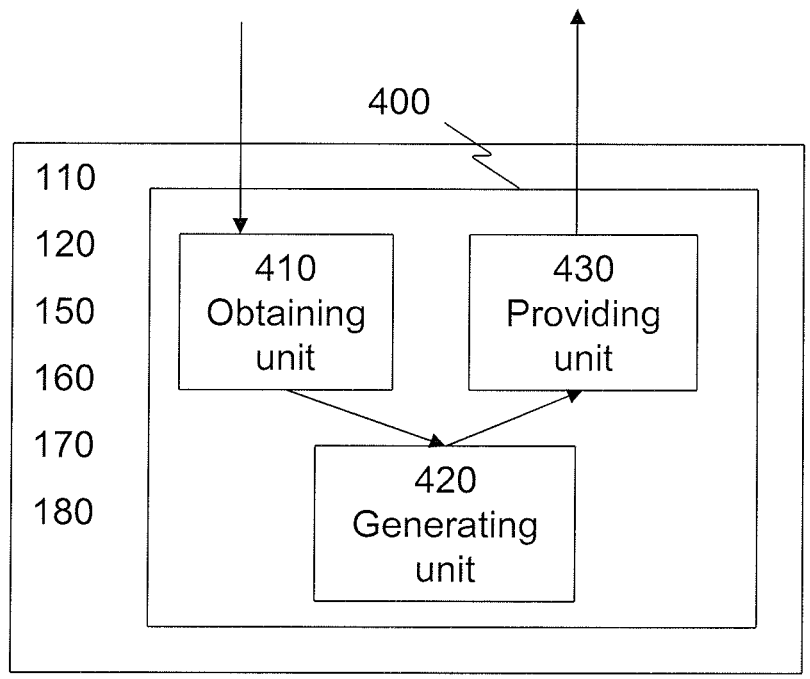
FIG. 6 shows a schematic block diagram of an embodiment of an arrangement for managing mobility control information in the radio communication system.

In FIG. 6, there is shown a schematic block diagram of an exemplifying arrangement 400 for managing mobility control information in a radio communication system 100, comprising a first radio network node 120 and a user equipment 130. The arrangement 400 may comprise an obtaining unit 410 configured to obtain from the first radio network node 120 mobility history relating to a plurality of cells visited by the user equipment 130, a generating unit 420 configured to generate mobility control information based on the mobility history, and a providing unit 430 configured to provide the mobility control information to the radio communication system 100. In this manner, the radio communication system 100 is enabled to use the mobility control information in a mobility control procedure relating to the user equipment when the user equipment moves among said plurality of cells.

In some embodiments of the arrangement 400 for managing mobility control information, the mobility history comprises one or more of:
  global cell identities for each cell visited by the user equipment,
  cell types of cells, identified by the global cell identities, and duration time for indicating time spent by the user equipment in cells, identified by the global cell identities.

In some embodiments of the arrangement 400 for managing mobility control information, the generating unit 420 further is configured to identify a non-preferred cell C2 among said plurality of cells based on the mobility history.

In some embodiments of the arrangement 400 for managing mobility control information, the mobility history indicates that the duration time for the non-preferred cell C2 is shorter than a threshold value.

In some embodiments of the arrangement 400 for managing mobility control information, the threshold value is pre-configured or dynamically determined based on the mobility history.

In some embodiments of the arrangement 400 for managing mobility control information, the mobility history is indicative of, by means of the global cell identities, a first cell C1 visited before and after the non-preferred cell C2.

In some embodiments of the arrangement 400 for managing mobility control information, the radio communication system 100 further comprises a second radio network node 140 and a first radio access network, comprising the first radio network node 120, wherein the generating unit 420 further is configured to generate corresponding mobility control information for at least one of the first and second radio network nodes 120, 140, based on the mobility history, and wherein the providing unit 430 is configured to provide the corresponding mobility control information.

In some embodiments of the arrangement 400 for managing mobility control information, the radio communication system 100 further comprises a second radio access network, wherein the second radio access network comprises the second radio network node 140.

In some embodiments of the arrangement 400 for managing mobility control information, the mobility history is indicative of, by means of the global cell identities, that a first and a second cell, visited before and after the non-preferred cell C2, respectively, are associated with the first radio access network and the non-preferred cell is served by the second radio network node, comprised in the second radio access network In some embodiments of the arrangement 400 for managing mobility control information, the first cell is associated with the first radio access network and the non-preferred cell is served by the second radio network node, comprised in the second radio access network.

In some embodiments of the arrangement 400 for managing mobility control information, the arrangement 400 is comprised in the first radio network node 120.

In some embodiments of the arrangement 400 for managing mobility control information, the arrangement 400 further is configured to generate common priorities information based on the mobility control information, and to send (by means of the providing unit 430, such as a sending unit) to the user equipment the common priorities information.

In some embodiments of the arrangement 400 for managing mobility control information, the arrangement 400 further is configured to generate dedicated priorities information based on the mobility control information, and to send (by means of the providing unit 430, such as a sending unit) to the user equipment the dedicated priorities information.

In some embodiments of the arrangement 400 for managing mobility control information, the arrangement 400 further is configured to apply the mobility control information as dynamic input to Hand Over algorithms in first radio network node 120.

In some embodiments of the arrangement 400 for managing mobility control information, wherein the first radio network node 120 is associated with a neighbour list, indicating cells that are neighbours to a cell in which the user equipment is located, the arrangement 400 being configured to delete the non-preferred cell from the neighbour list.

In some embodiments of the arrangement 400 for managing mobility control information, the arrangement 400 further is configured to detect a coverage hole based on the mobility history, whereby network configuration procedures use the detected coverage hole as dynamic input.

In some embodiments of the arrangement 400 for managing mobility control information, the arrangement 400 is comprised in a network node 110, 150, 160, 170, 180 comprised in the radio communication system 100, wherein the network node 110 is different from the first radio network node 120.

Figure 7:
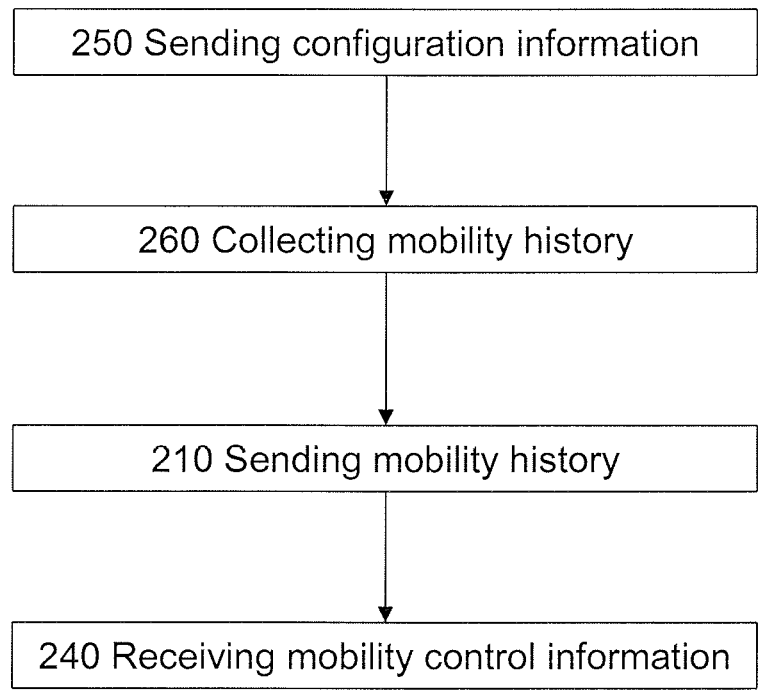
FIG. 7 shows a schematic flow chart of an embodiment of a method in the radio network node for enabling a network node to generate mobility control information to be used by the radio network node for managing signalling and processing due to mobility events in the radio communication system.

In FIG. 7, there is shown a schematic flow chart of an embodiment of a method in a first radio network node 120 for enabling a network node 110, 150, 160, 170, 180 to generate mobility control information to be used by the radio network node 120 for managing signalling and processing due to mobility events in a radio communication system 100, wherein the radio communication system 100 comprises the network node 110 and the first radio network node 120. The following steps may be performed. The order of the steps may differ from what is described below or from what is illustrated in FIG. 7.

In an optional step 250, the first radio network node 120 may send configuration information to the network node 110, 150, 160, 170, 180 comprising the MC functionality.

In a step 260, the first radio network node 120 collects mobility history relating to a user equipment connected to the first radio network node 120.

In another step 210, the first radio network node 120 sends the mobility history to the network node 110.

In another step 240, the first radio network node 120 receives from the network node 110 mobility control information associated with the first radio network node 120.

In some embodiments of the method in the first radio network node 120 for enabling a network node 110, 150, 160, 170, 180 to generate mobility control information, the method further comprises a step of, after the step of providing the mobility history, releasing user equipment context from the first radio network node 120.

In some embodiments of the method in the first radio network node 120 for enabling a network node 110, 150, 160, 170, 180 to generate mobility control information, the method further comprising a step of applying SIB3-SIB19 (see FIG. 12) the mobility control information.

In some embodiments of the method in the first radio network node 120 for enabling a network node 110, 150, 160, 170, 180 to generate mobility control information, the step of applying further comprises generating common priorities information based on the mobility control information, and sending to the user equipment the common priorities information.

In some embodiments of the method in the first radio network node 120 for enabling a network node 110, 150, 160, 170, 180 to generate mobility control information, the step of applying further comprises generating dedicated priorities information based on the mobility control information, and sending to the user equipment the dedicated priorities information.

In some embodiments of the method in the first radio network node 120 for enabling a network node 110, 150, 160, 170, 180 to generate mobility control information, the step of applying further comprises increasing the time to trigger Hand Over to a cell based on the mobility control information.

In some embodiments of the method in the first radio network node 120 for enabling a network node 110, 150, 160, 170, 180 to generate mobility control information, the first radio network node 120 is associated with a neighbour list, indicating cells that are neighbours to a cell in which the user equipment is located, the mobility control information indicating a non-preferred cell, wherein the step of applying further comprises deleting the non-preferred cell from the neighbour list.

In some embodiments of the method in the first radio network node 120 for enabling a network node 110, 150, 160, 170, 180 to generate mobility control information, the method further comprises a step of detecting a coverage hole based on the mobility history, whereby network configuration procedures may use information about the detected coverage hole.

In some embodiments of the method in the first radio network node 120 for enabling a network node 110, 150, 160, 170, 180 to generate mobility control information, the mobility history comprises one or more of:
  global cell identities for each cell visited by the user equipment, e.g. E-CGI for E-UTRAN cells, CGI for GERAN cells, and LAI & CI for UTRAN cells,
  cell types of cells, identified by the global cell identities, such as {macro, micro, pico or femto} in RANAP and {very small, small, medium, large} in S1AP, and
  duration time for indicating time spent by the user equipment in cells, identified by the global cell identities.

Optionally, the mobility history may further comprise a frequency band indicator for identifying the frequency band(s) used in the cell(s), identified by the global cell identities.

Figure 8:
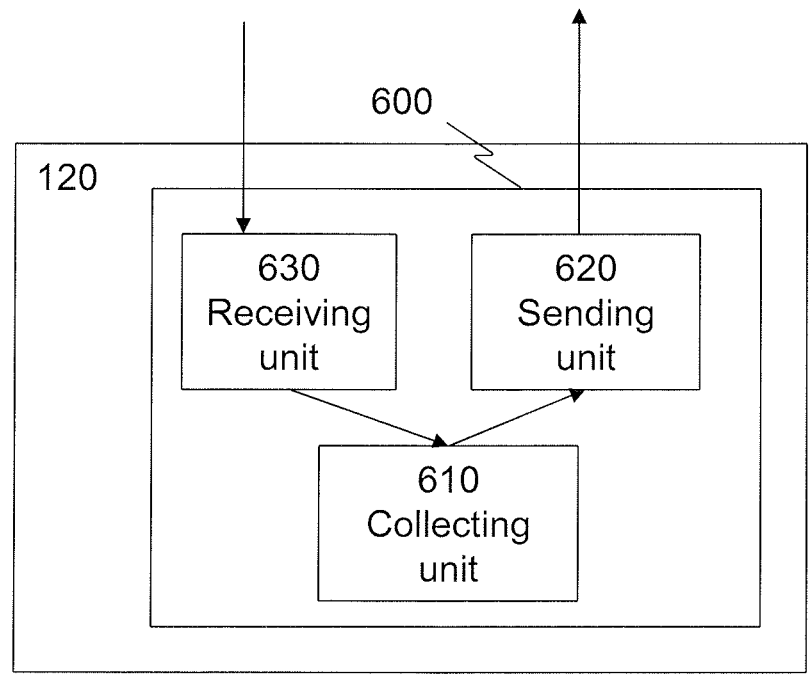
FIG. 8 shows a schematic block diagram of an embodiment of an arrangement in the radio network node for enabling a network node to generate mobility control information to be used by the radio network node for managing signalling and processing due to mobility events in the radio communication system.

In FIG. 8, there is shown a schematic block diagram of an exemplifying arrangement 600 in a first radio network node 120 for enabling a network node 110 to generate mobility control information to be used by the first radio network node 120 for managing signalling and processing due to mobility events in a radio communication system 100, wherein the radio communication system 100 comprises the network node 110 and the first radio network node 120. The arrangement 600 may comprise a collecting unit 610 configured to collect mobility history relating to a user equipment connected to the first radio network node 120, a sending unit 620 configured to send the mobility history to the network node 110, and a receiving unit 630 configured to receive from the network node 110 mobility control information associated with the first radio network node 120.

In some embodiments of the arrangement 600 in the first radio network node 120 for enabling a network node 110, 150, 160, 170, 180 to generate mobility control information, the arrangement 600 further is configured to release user equipment context from the first radio network node 120.

In some embodiments of the arrangement 600 in the first radio network node 120 for enabling a network node 110, 150, 160, 170, 180 to generate mobility control information, the arrangement 600 further is configured to apply SIB3-SIB19 (see FIG. 12) the mobility control information.

In some embodiments of the arrangement 600 in the first radio network node 120 for enabling a network node 110, 150, 160, 170, 180 to generate mobility control information, the arrangement 600 further is configured to generate common priorities information based on the mobility control information, and the sending unit 620 is further configured to send to the user equipment the common priorities information.

In some embodiments of the arrangement 600 in the first radio network node 120 for enabling a network node 110, 150, 160, 170, 180 to generate mobility control information, the arrangement 600 further is configured to generate dedicated priorities information based on the mobility control information, and the sending unit 620 is further configured to send to the user equipment the dedicated priorities information.

In some embodiments of the arrangement 600 in the first radio network node 120 for enabling a network node 110, 150, 160, 170, 180 to generate mobility control information, the arrangement 600 further is configured increase the time to trigger Hand Over to a cell based on the mobility control information.

In some embodiments of the arrangement 600 in the first radio network node 120 for enabling a network node 110, 150, 160, 170, 180 to generate mobility control information, the first radio network node 120 is associated with a neighbour list, indicating cells that are neighbours to a cell in which the user equipment is located, the mobility control information indicating a non-preferred cell, wherein the arrangement 600 further is configured to delete the non-preferred cell from the neighbour list.

In some embodiments of the arrangement 600 in the first radio network node 120 for enabling a network node 110, 150, 160, 170, 180 to generate mobility control information, the arrangement 600 is configured to detect a coverage hole based on the mobility history, whereby network configuration procedures may use information about the detected coverage hole.

In some embodiments of the arrangement 600 in the first radio network node 120 for enabling a network node 110, 150, 160, 170, 180 to generate mobility control information, the mobility history comprises one or more of:
  global cell identities for each cell visited by the user equipment, e.g. E-CGI for E-UTRAN cells, CGI for GERAN cells, and LAI & CI for UTRAN cells,
  cell types of cells, identified by the global cell identities, such as {macro, micro, pico or femto} in RANAP and {very small, small, medium, large} in S1AP, and
  duration time for indicating time spent by the user equipment in cells, identified by the global cell identities.

Optionally, the mobility history may further comprise a frequency band indicator for identifying the frequency band(s) used in the cell(s), identified by the global cell identities.

Figure 9:
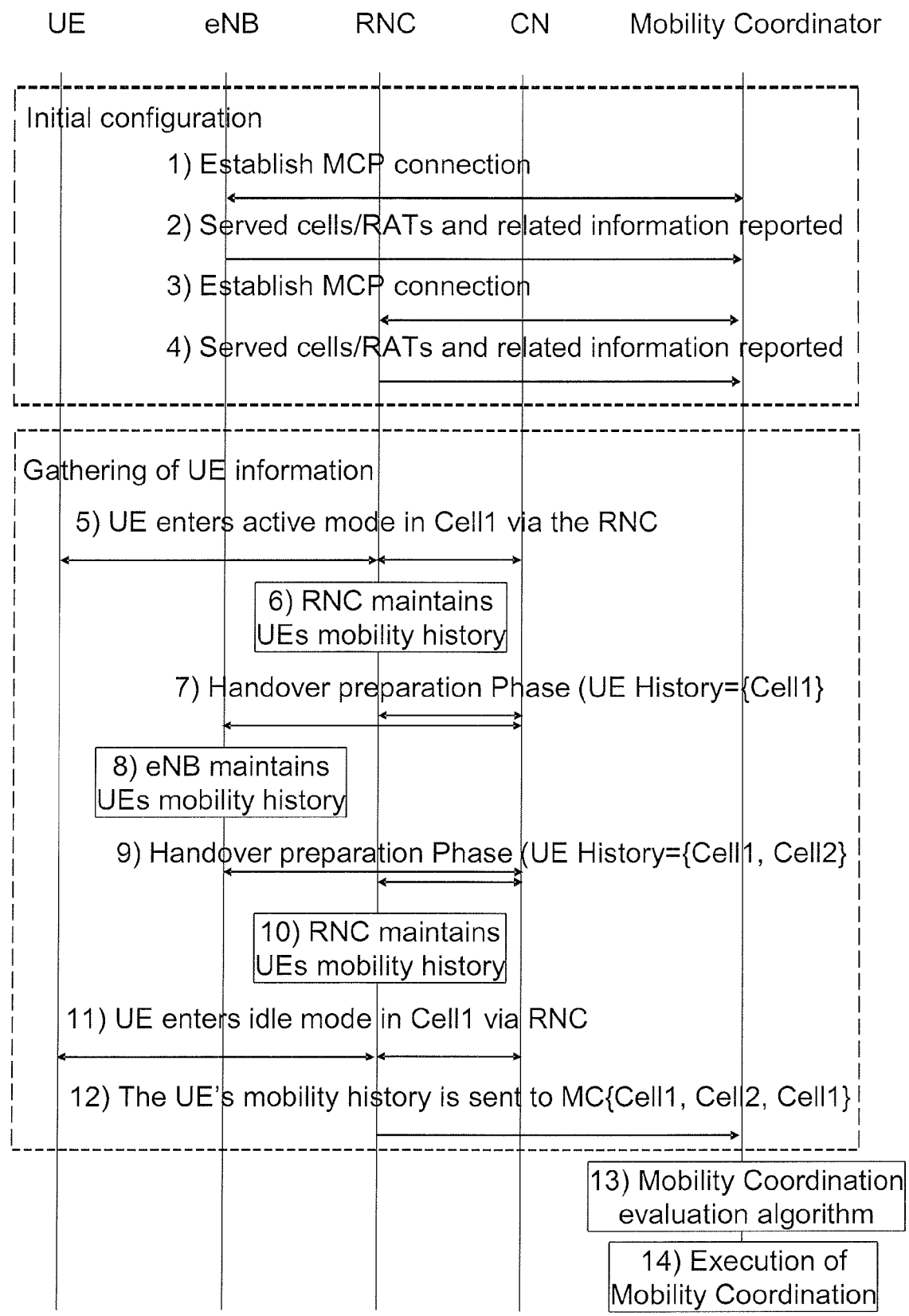
FIG. 9 shows a combined signalling and flow chart of an exemplifying method for managing mobility control information in the radio communication system.

With reference to FIG. 9, the four main steps (or phases) of the solution presented herein will be described in more detail.

In the step of configuration, each RAN node dynamically selects the correct MC function, establishes a connection to the MC and provides information about all the served cells/RATs and the known neighbour cells to the MC. Once the connection between the mobility coordinator and the RAN Node is established, the RAN Node uses an MCP protocol (mobility coordinator protocol, see FIG. 11) to provide information about served cells/RAT(s) and the known neighbour cells/RATs. Once the initial connection has been established, a RAN node may send an update, if for example a cell is added to the node or when neighbouring cells are detected. Configuration information sent to MC may comprise:
  Node identity (e.g. RNC-ID, eNB-ID and/or some form of BSC node identity)
  Node type (i.e. RAT type, e.g. GERAN, WCDMA and/or LTE)

Global Cell identities on node (e.g. CGI, E-CGI, LAI+CI)
Cell types of cells (e.g. very small, small, medium, large)
Neighbour cells (e.g. CGI, E-CGI, LAI+CI)
Neighbour cell creation method (e.g. ANR, manual)

In steps 1-4, the eNB, RNC and/or the BSC establish the MCP connection to the MC and inform the MC about served cells and related information (like neighbouring cells).

In the second main step (or phase), the RAN node(s) gather(s) information (such as mobility history) about UE movements and the information is forwarded to the MC for evaluation. The gathered information may in some embodiments be the same as UE History i.e. the cells/RATs visited in active mode, cell type and the duration of each visit. Optionally, also frequency band used may be comprised in the mobility history. The RAN node sends (or provides) the mobility history to MC at the end of the UE connection. Another alternative is that the MC informs the RAN node about a timer value during the configuration phase. This timer value is used to periodically inform the MC about the UEs' mobility history. This may be useful in the case when an UE stays in active mode always or a very long time. The mobility history is gathered in each RAN node handling the UE's connection and then forwarded between the RAN nodes at handover so that each RAN Node forwards the mobility history to the next RAN Node handling the UE connection. The last RAN Node, in which the UE connection is released, forwards (or provides) the mobility history to the MC functionality.

The different steps shown in FIG. 9 are as follows:

In step 5), a user equipment UE enters active mode in Cell1 via RNC.

In step 6), the RNC maintains the UE's mobility history on cell level.

In step 7), the RNC triggers (or orders) IRAT handover to the LTE Cell2. The mobility history is provided to the target eNB during handover preparation phase. In this case the information gathered so far comprise {Cell1}.

In step 8), the eNB maintains UE's mobility history on cell level.

In step 9), the eNB orders IRAT handover to the UTRAN Cell1. The mobility history is provided to the target RNC during handover preparation phase. In this case, the mobility history gathered so far may comprise {Cell1, Cell2}.

In step 10), the RNC maintains UE's mobility history on cell level.

In step 11), the user equipment enters idle mode.

In step 12) the RNC sends to the MC the UE's mobility history. In this case, the mobility history may so far comprise {Cell-1, Cell-2, Cell-1}. It may be preferred to collect mobility history from a plurality of UEs before applying the mobility control information to the radio communication system. In this manner, it may be assured that the mobility control information applied to the radio communication system is more accurate from a statistical point of view.

In the third main step (or phase), the MC evaluates the mobility history. The MC may combine information received from multiple RAN Nodes and for multiple user equipment connections and draw conclusions based on this network wide information. This step is called Mobility Coordination Evaluation Algorithm. One goal with this step is to dynamically identify cells which only were used, for example, a few seconds during the session.

In a scheme as illustrated in FIG. 1, the MC may detect IRAT handovers where preceding and succeeding cells are always the same cell. This may indicate that a cell from a RAT with better coverage is covering the cell in question. This may be combined with a time criteria; i.e. the stay in the cell needs to be below a certain time period, which may be predetermined or dynamically determined.

In step 13), the MC performs a Mobile Coordination evaluation algorithm. An example of this illustrated above in FIG. 4, in which the MC looks for IRAT handovers where preceding and succeeding cells always are from same RAT. This indicates that a RAT with better coverage is covering the cell in question. This may be combined with a time criteria; i.e. the stay in the cell needs to be below a certain time.

Figure 10:
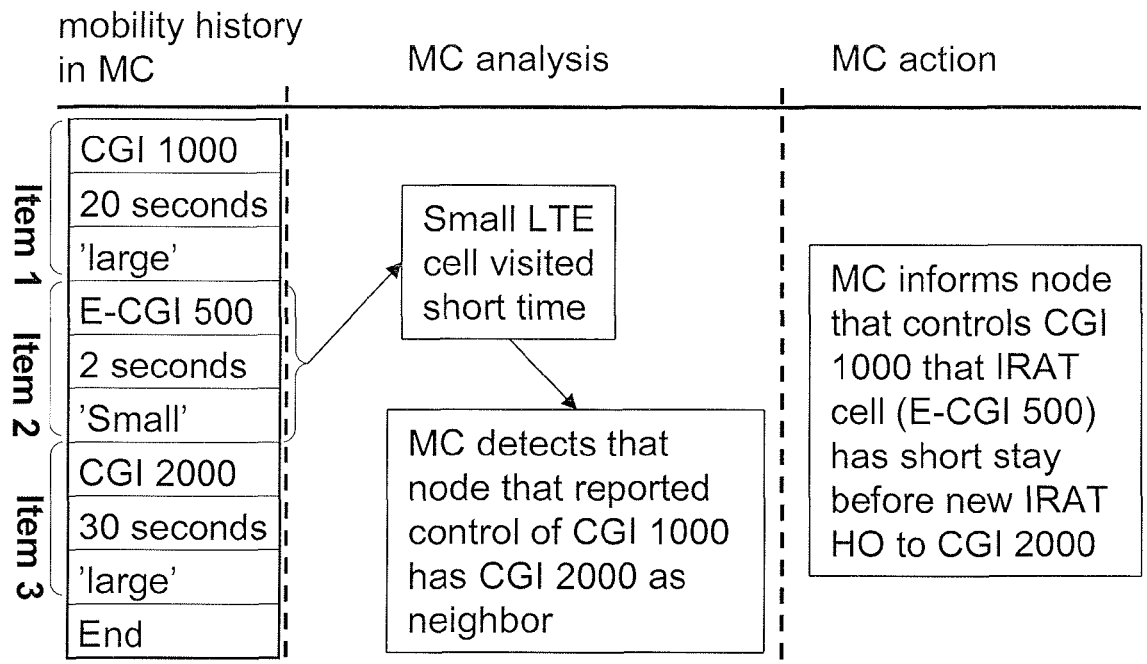
FIG. 10 shows an example of a mobility history evaluation procedure.

Moreover, in FIG. 10, there is shown an example of a mobility history evaluation procedure, in which the mobility history indicates that a small LTE cell, item 2, has been visited for a short time, i.e. 2 seconds. The MC then concludes that it is better to set cell CGI 1000 of item 1 as a neighbour to CGI 2000 of item 3. Next, the MC informs the corresponding node, such as an eNB, RNC or BSC, than for example handover from cell CGI 1000 is to be performed to CGI 2000. As an option, the MC may simply inform the corresponding node that cell E-CGI 500 has a short visit. Then corresponding node may then draw conclusions for handling, for example, handover therefrom.

In some embodiments, the MC may also take the size of cells into account, e.g. for the intra RAT case look for when a 'very small cell' has been used for a short time.

In the fourth main step, the mobility control information is used in order to reduce signalling due to mobility events. The MC may provide the mobility control information to be used directly by an operator (or information to post processing system before presentation) or the mobility control information may be forwarded to the RAN Nodes. The RAN Nodes may use the mobility control information for the following different purposes:

To guide user equipment idle mode priority based camping strategies Common Priorities (i.e. by changing of information included in the broadcasted SI) or by Dedicated Priorities (i.e. providing a user equipment with dedicated priority information).

To guide the RAN Node in Handover Target Cell Selection.

Neighbour list pruning.

In step 14), the execution of the Mobile Coordination is performed as described herein.

Figure 11:
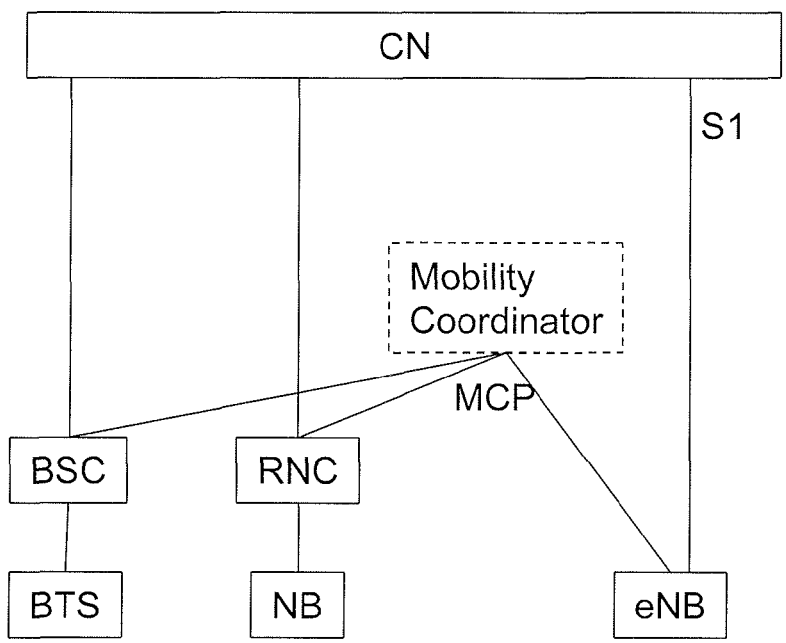
FIG. 11 shows an exemplifying block diagram, in which a protocol is indicated.

FIG. 11 shows a block diagram in which an exemplifying Mobility Coordinator Protocol is indicated. The protocol is needed to convey information between the Mobility Coordinator function and the participating RAN nodes. The protocol may sometimes be referred to as MCP herein. The details of and principles for this protocol is not essential for this invention, and is not further described herein. There are several variants on how often MC informs the participating nodes. One could be that MC is configured with how often a participating node should be informed when a node connects to MC. The time supervision is started for that node and when that timer expires, MC informs about the current findings. This would spread the signalling in time since it depends on when nodes connect. Another variant is that MC evaluates received information during a (configurable) time, and when that time expires, MC informs the participating nodes. With this mode of operation, modifications to the network would be dynamically taken into account. For example as the LTE coverage increases, user equipments may to a larger extent be allowed to camp on cells belonging to an LTE network without causing a lot of signalling.

Furthermore, the MC may be local in a combined network node as described above or the MC may be covering a certain geographical area. For example, a number of Routing Areas/Tracking Areas (RA/TA) may be controlled by one MC, and other areas may be controlled by other MCs. This geographical split may also change as the network and load in the networks grow. A flexible way to handle connections between nodes and MCs are needed and this can be achieved by using DNS to resolve the MC addresses for example from the RAs/TAs being served by the RAN node.

For methods for execution of mobility control information based on common priorities, dedicated priorities and handover target cell selection, the RAN Nodes apply the temporary measures only for a limited time. When this time has passed, the configured behaviour will be resumed. This may result in that the MC informs the RAN Node again and the procedures with temporary actions are repeated. This way MC can be 'stateless' and changes to the network are dynamically picked up. Furthermore, the RAN Node doesn't need to apply the new behaviour for all user equipments. Instead it may select only a subset of all user equipments that should be reconfigured with new RAT priority parameters. This could for example be applied only for (fast) moving users and/or when Subscriber Profile ID (SPID) indicates that certain RAT priority could be beneficial.

Figure 12:
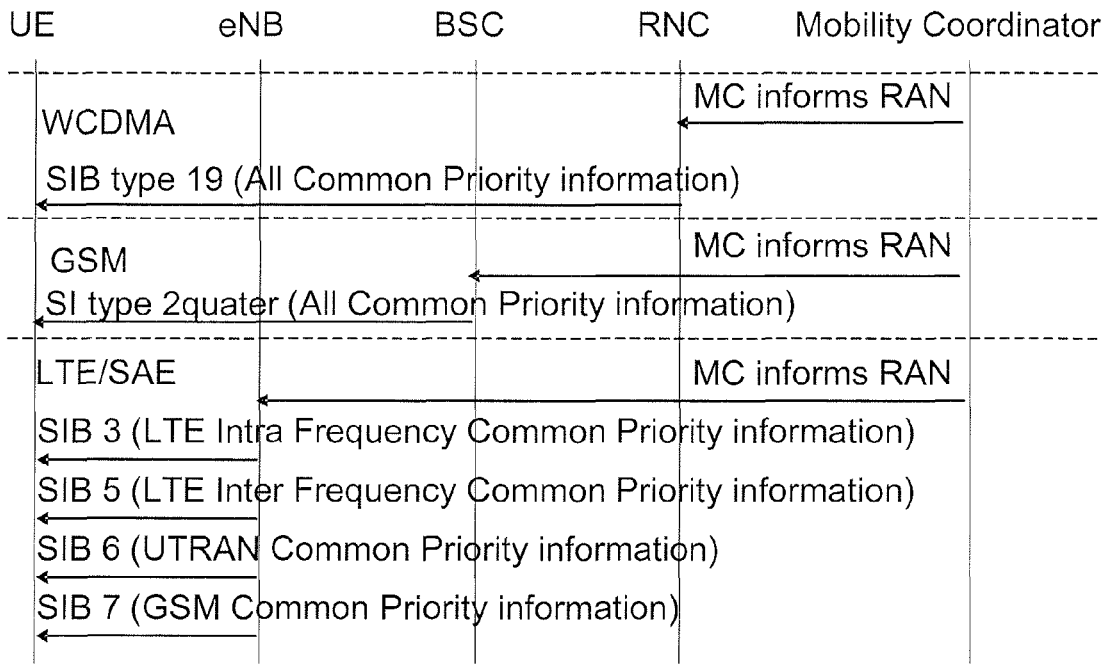
FIG. 12 shows an exemplifying combined signalling and flow chart for illustrating how common priorities may be used to apply the mobility control information.
Figure 13:
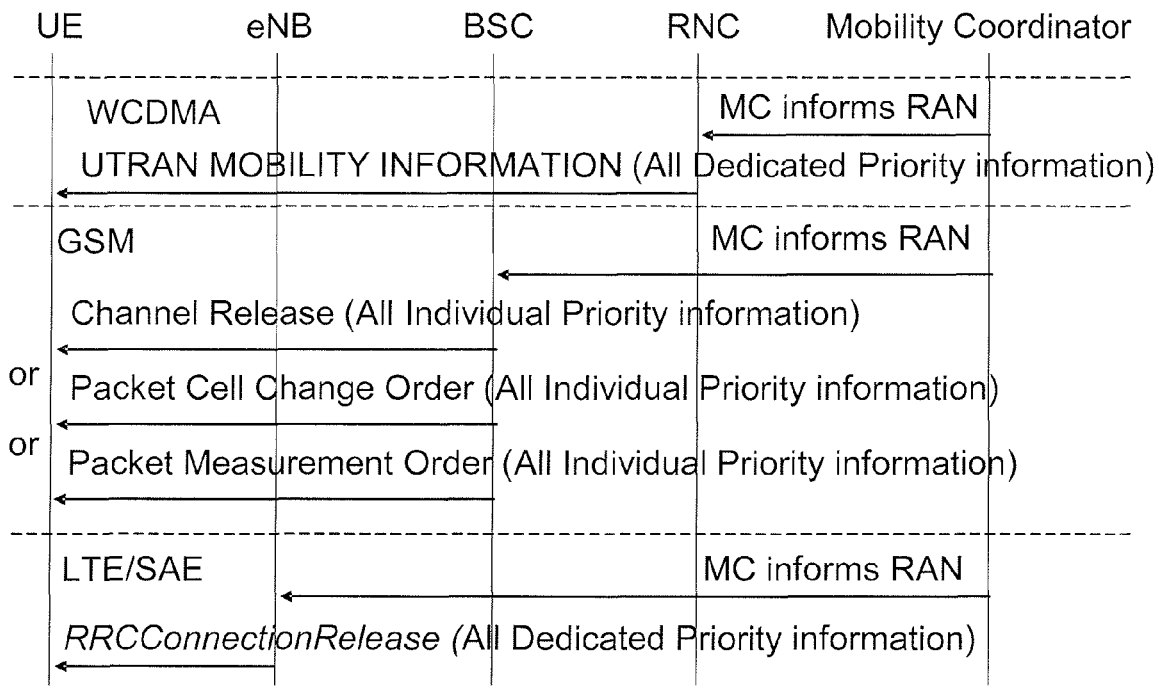
FIG. 13 shows an exemplifying combined signalling and flow chart for illustrating how dedicated priorities may be used to apply the mobility control information.

Referring to FIGS. 12 and 13, priority based cell reselection may provide information to the user equipment cell reselection algorithm to reduce the needed user equipment measurements and is achieved with Common Priorities. The provided information may be made user equipment-specific and is achieved with Dedicated/Individual Priorities. As these names indicate, the Common Priorities information provided is same for all user equipments and is broadcasted as part of the cell system information. The Dedicated/Individual Priorities can be user equipment (or subscription) specific and is provided to the user equipment using unicast/dedicated signalling and overrides the common priorities. Priority based cell reselection is defined for, for example, GERAN, UTRAN and E-UTRAN. A principle is that the network provides the absolute priority information for the serving cell and other frequency layers and RATs together with more traditional cell reselection parameters.

In FIG. 12, the Common Priorities information provided is the same for all user equipments and is broadcasted as part of the cell system information in the following way for the different RATs.
  WCDMA: SIB 19 as defined in 3GPP TS 25.331. The main contents are:
    UTRAN Serving cell: priority and cell re-selection parameters
    UTRAN inter-frequency layers (for each):
      priority and cell re-selection parameters
      GSM cell groups (identified by band and number of ARFCNs):
        Priority and cell re-selection parameters
    E-UTRAN layers (for each)
      priority and cell re-selection parameters
      a list of Blacklisted cells (optional).
  GSM: SI2 Quarter as defined in 3GPP TS 44.018. The main contents are:
    GERAN Serving cell: priority and cell re-selection parameters
    UTRAN inter-frequency layers (for each):
      priority and cell re-selection parameters
    E-UTRAN layers (for each)
      priority and cell re-selection parameters
      a list of Blacklisted cells (optional)
  LTE: in different System Information Blocks (separate for each frequency or RAT) as defined in 3GPP TS 36.331.

In this case, the Common Priorities information as specified above is changed. Two examples are given here on how this information may be changed.

In one example, the RNC may change the SIB 19 in the affected cell to indicate that UTRAN is to have higher priority than E-UTRAN to avoid that a user equipment reselects from UTRAN to E-UTRAN. Other system information could also be used to control inter-RAT cell reselection. For example, in UTRAN a scaling factor can be applied to control how fast a reselection to another RAT should take place. This is indicated in SIB ¾ in the parameter 'Inter-RAT ScalingFactor for reselection. In another example, the BSC may change the SI2 quarter in the affected cell to indicate that GSM is to have higher priority than 3G/LTE. One drawback with all the above SI based approaches in the BSC and RNC is that the indicated information would apply to all UEs in the affected cell, i.e. even if these have never been close to the cell to be avoided. As the priorities are sent for RAT and carrier combinations, this would mean that all these UEs would then avoid all cells on the indicated RAT and carrier. For this reason, it may be feasible to instead only use the Dedicated Priorities from the cell to be avoided. This may decrease the above described drawback. When the respective RAN node has been informed it changes the broadcasted system information in relevant cells.

In FIG. 13, the Dedicated/Individual Priorities may be UE (or subscription) specific and is provided to the UE using unicast/dedicated signalling. The name Dedicated Priority is used in UTRAN and E-UTRAN specifications and the name Individual Priority is used in GERAN specifications. The total information provided to the UE is basically the same as in the Common Priorities case described in previous section. Only the different priorities are sent to the UE in unicast/dedicated signalling and for the rest of the needed information, the Common Priorities information is used (i.e. as described in previous section). In addition, the UE is provided with a timer value indicating how long the received information is to be considered as valid (the possible value range is 5-180 minutes). However, it may be preferred that the dedicated priority information is refreshed before timeout of this timer as the user equipment is likely to perform for example periodic Location Registrations before timeout. The different mechanisms for sending the Dedicated/Individual Priorities information to the user equipment in the different RATs are:
  GSM/GPRS: Channel Release, Packet Cell Change Order and Packet Measurement Order messages
  WCDMA: RRC UTRAN MOBILITY INFORMATION message
  LTE: RRCConnectionRelease message The currently assumed principle for how the RAN node selects the Dedicated/Individual Priority for the different UEs (or subscriptions) is as follows.
  The subscription in the HLR/HSS is marked with specific RFSP index, which is short for "Subscriber Profile ID for RAT/Frequency Priority (RFSP-ID)". RFSP-ID is just a number between 1 and 256. This is done for selected subscribers
  The CN node (i.e. SGSN or MME) receives the RFSP-ID index, i.e. the subscription information from the HLR/HSS. The RFSP-ID is forwarded to the RAN node when UE context is established in the RAN. However, in the CN-RAN interfaces, the RFSP-ID is called Subscriber Profile ID (SPID).
  The RAN node is configured with different combinations of Dedicated/Individual Priorities. The RAN node uses the received SPID to select one of configured Dedicated/Individual Priority information and forwards this to the UE as described above.

In another example, where 3G is to have priority over LTE, a participating RNC receives information from MC about that a IRAT cell should be avoided, then the RNC can send UTRAN MOBILITY INFORMATION message to the UE comprising the Dedicated Priority Information parameter indicating that UTRAN has highest priority. In a further example, where GERAN is to have priority over 3G, a participating BSC receives information from MC about that an IRAT cell should be avoided, then the BSC can send a CHANNEL RELEASE message to the UE comprising the Dedicated Priority Information parameter indicating that GSM has highest priority. Received information in the CS domain also applies for the PS domain.

In a still further example, where GERAN is to have priority over 3G/LTE, a participating BSC receives information from MC about that an IRAT cell should be avoided, then the BSC can send either a PACKET MEASUREMENT ORDER message or a PACKET CELL CHANGE ORDER to the UE comprising the Individual Priority Information parameters indicating that GSM has highest priority. Received information in the PS domain also applies for the CS domain. When the respective RAN node has been informed, it selects active user equipments in relevant cells and sends dedicated priority information.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a mobility coordinator for managing mobility control information in a radio communication system, comprising a first radio network node, a hardware module comprising the mobility coordinator, and a user equipment, the method comprising:
   obtaining by the mobility coordinator and from the first radio network node mobility history relating to a plurality of cells visited by the user equipment;
   generating by the mobility coordinator mobility control information comprising an identification of a non-preferred cell among the plurality of cells visited by the user equipment based on the mobility history; and
   providing the mobility control information from the mobility coordinator to the radio communication system to control in a mobility control procedure relating to the user equipment when the user equipment moves among said plurality of cells.

2. The method according claim 1, wherein the mobility history comprises one or more of:
   global cell identities for a plurality of cells visited by the user equipment;
   cell types of cells that are identified by global cell identities for said plurality of cells; and
   duration time that indicates time spent by the user equipment in individual ones of said plurality of cells identified by global cell identities for said plurality of cells.

3. The method according to claim 1,
   wherein the mobility history comprises duration time that indicates time spent by the user equipment in individual ones of said plurality of cells, and
   wherein the mobility history indicates that the duration time for the non-preferred cell is shorter than a threshold time value.

4. The method according to claim 3, further comprising:
   dynamically determining the threshold time value based on the mobility history,
   wherein identifying the non-preferred cell comprises determining that the time spent by the user equipment in the non-preferred cell is shorter than the dynamically determined threshold time value.

5. The method according to claim 1,
   wherein the mobility history comprises global cell identities for a plurality of cells visited by the user equipment, and
   wherein the mobility history indicates, by the global cell identities, that a first cell is visited before and after the non-preferred cell.

6. The method according to claim 1,
   wherein the radio communication system further comprises a second radio network node and a first radio access network, comprising the first radio network node,
   wherein generating mobility control information comprises generating corresponding mobility control information for at least one of the first and second radio network nodes, based on the mobility history, and
   wherein providing the mobility control information comprises providing the corresponding mobility control information.

7. The method according to claim 6,
   wherein the radio communication system further comprises a second radio access network, and
   wherein the second radio access network comprises the second radio network node.

8. The method according to claim 7, further comprising:
   detecting and registering a coverage hole of the first radio access network,
   wherein the mobility history comprises global cell identities for the plurality of cells visited by the user equipment,
   wherein detecting the coverage hole comprises detecting that the mobility history indicates, by the global cell identities, that a first cell and a second cell, visited before and after the non-preferred cell, respectively, are associated with the first radio access network and the non-preferred cell is served by the second radio network node, comprised in the second radio access network, and
   wherein the first radio access network comprises a first radio access technology and the second radio access network comprises a second radio access technology different from the first radio access technology.

9. The method according to claim 7,
   wherein the mobility history comprises global cell identities for a plurality of cells visited by the user equipment,
   wherein the mobility history indicates, by the global cell identities, that a first cell is visited before and after the non-preferred cell, and
   wherein the first cell is associated with the first radio access network and the non-preferred cell is served by the second radio network node, comprised in the second radio access network.

10. The method according to claim 1, wherein the method is performed by the first radio network node.

11. The method according to claim 10, further comprising:
   generating common priorities information based on the mobility control information; and
   sending to the user equipment the common priorities information.

12. The method according to claim 10, further comprising:
   generating dedicated priorities information based on the mobility control information; and
   sending to the user equipment the dedicated priorities information,
   wherein the dedicated priorities information is specific to the user equipment.

13. The method according to claim 10, further:
using the mobility control information as dynamic input to control Hand Over algorithms in the first radio network node.

14. The method according to claim 10,
wherein generating mobility control information further comprises identifying a non-preferred cell among said plurality of cells based on the mobility history,
wherein the first radio network node is associated with a neighbour list, indicating cells that are neighbours to a cell in which the user equipment is located, and
wherein the method further comprising deleting the non-preferred cell from the neighbour list in response to the identifying a non-preferred cell.

15. The method according to claim 10, further comprising:
detecting a coverage hole based on the mobility history; and
controlling network configuration procedures to respond to the detected coverage hole,
wherein the network configuration procedures define a neighbor list.

16. The method according to claim 1, wherein the method is performed by a network node comprised in the radio communication system, wherein the network node is different from the first radio network node.

17. A hardware module for managing mobility control information in a radio communication system, comprising a first radio network node and a user equipment, the hardware module configured to:
obtain from the first radio network node mobility history relating to a plurality of cells visited by the user equipment;
generate mobility control information comprising an identification of a non-preferred cell among the plurality of cells visited by the user equipment based on the mobility history; and
provide the mobility control information to the radio communication system, to control a mobility control procedure relating to the user equipment when the user equipment moves among said plurality of cells.

18. A method in a first radio network node for enabling a network node to generate mobility control information to be used by the first radio network node for managing signaling and processing due to mobility events in a radio communication system, wherein the radio communication system comprises the network node and the first radio network node, the method comprising:
collecting mobility history relating to a user equipment connected to the first radio network node, the mobility history indicating a plurality of cells visited by the user equipment;
sending the mobility history to the network node; and
receiving from the network node mobility control information associated with the first radio network node, the mobility control information comprising identification of a non-preferred cell among the plurality of cells visited by the user equipment based on the mobility. history.

19. The method according to claim 18, further comprising:
after sending the mobility history, releasing user equipment context from the first radio network node.

20. The method according to claim 18, further comprising:
applying the mobility control information to manage signaling and processing due to mobility events in the radio communication system.

21. The method according to claim 20, wherein applying further comprises:
generating common priorities information based on the mobility control information; and
sending to the user equipment the common priorities information.

22. The method according to claim 20, wherein applying further comprises:
generating dedicated priorities information based on the mobility control information; and
sending to the user equipment the dedicated priorities information,
wherein the dedicated priorities information is specific to the user equipment.

23. The method according to claim 20, wherein applying further comprises:
increasing a time to trigger Hand Over to a cell based on the mobility control information.

24. The method according to claim 20, wherein the first radio network node is associated with a neighbour list, indicating cells that are neighbours to a cell in which the user equipment is located, wherein applying further comprises:
deleting the non-preferred cell from the neighbour list in response to the mobility control information indicating a non-preferred cell.

25. The method according to claim 20, further comprising:
detecting a coverage hole based on the mobility history; and
controlling network configuration procedures to respond to the detected coverage hole,
wherein the network configuration procedures define a neighbor list.

26. The method according to claim 18, wherein the mobility history comprises one or more of:
global cell identities for a plurality of cells visited by the user equipment,
cell types of cells that are identified by global cell identities for said plurality of cells, and
duration time that indicates time spent by the user equipment in individual ones of said plurality of cells identified by global cell identities for said plurality of cells.

27. An arrangement in a first radio network node for enabling a network node to generate mobility control information to be used by the first radio network node for managing signaling and processing due to mobility events in a radio communication system, wherein the radio communication system comprises the network node and the first radio network node, the arrangement configured to:
collect mobility history relating to a user equipment connected to the first radio network node, the mobility history indicating a plurality of cells visited by the user equipment;
send the mobility history to the network node and
receive from the network node mobility control information associated with the first radio network node, the mobility control information comprising identification of a non-preferred cell among the plurality of cells visited by the user equipment based on the mobility history.

28. The method according to claim 1,
wherein the method is performed by a mobility coordinator comprised in the radio communication system, wherein the mobility coordinator is remote from the first radio network node,
wherein the mobility coordinator obtains from the first radio network node the mobility history and generates the mobility control information, and
wherein providing the mobility control information comprises sending the mobility control information from the mobility coordinator to the first radio network node.

29. The method according to claim 4, wherein dynamically determining the threshold time value comprises setting the threshold time value to a predetermined percentage of an average duration time based on the mobility history.

30. The method according to claim 25,
wherein the mobility history comprises global cell identities for the plurality of cells visited by the user equipment,
wherein detecting the coverage hole comprises detecting that the mobility history indicates, by the global cell identities, that a first cell and a second cell, visited before and after the non-preferred cell, respectively, are associated with a first radio access network and the non-preferred cell is served by a second radio network node, comprised in a second radio access network, and
wherein the first radio access network comprises a first radio access technology and the second radio access network comprises a second radio access technology different from the first radio access technology.

* * * * *

UNITED STATES PATENT AND TRADEMARK OFFICE
CERTIFICATE OF CORRECTION

| | |
|---|---|
| PATENT NO. | : 9,226,130 B2 |
| APPLICATION NO. | : 13/702279 |
| DATED | : December 29, 2015 |
| INVENTOR(S) | : Nylander et al. |

Page 1 of 1

It is certified that error appears in the above-identified patent and that said Letters Patent is hereby corrected as shown below:

On the Title Page, in Item (57), under "ABSTRACT", in Column 2, Line 3, delete "(120)," and insert -- (120). --, therefor.

On the Title Page, in Item (57), under "ABSTRACT", in Column 2, Line 6, delete "(100)," and insert -- (100). --, therefor.

Claims

In Column 21, Line 47, in Claim 2, delete "according" and insert -- according to --, therefor.

In Column 23, Line 58, in Claim 18, delete "mobility." and insert -- mobility --, therefor.

In Column 24, Line 51, in Claim 27, delete "node" and insert -- node; --, therefor.

Signed and Sealed this
Nineteenth Day of April, 2016

Michelle K. Lee
*Director of the United States Patent and Trademark Office*